(12) United States Patent
Cen

(10) Patent No.: US 11,534,916 B2
(45) Date of Patent: Dec. 27, 2022

(54) ROBOT CONTROL METHOD, ROBOT AND STORAGE MEDIUM

(71) Applicant: ECOVACS ROBOTICS CO., LTD., Suzhou (CN)

(72) Inventor: Bin Cen, Suzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 236 days.

(21) Appl. No.: 16/513,341

(22) Filed: Jul. 16, 2019

(65) Prior Publication Data
US 2020/0023517 A1 Jan. 23, 2020

(30) Foreign Application Priority Data
Jul. 19, 2018 (CN) .......................... 201810797893.5

(51) Int. Cl.
*B25J 9/16* (2006.01)
(52) U.S. Cl.
CPC .................................. *B25J 9/1664* (2013.01)
(58) Field of Classification Search
CPC combination set(s) only.
See application file for complete search history.

(56) References Cited

U.S. PATENT DOCUMENTS

| | | | | |
|---|---|---|---|---|
| 5,942,869 A | * | 8/1999 | Katou | ........................ B25J 5/00 318/568.12 |
| 7,768,417 B2 | | 8/2010 | Choi et al. | |
| 2005/0065655 A1 | | 3/2005 | Hong et al. | |
| 2005/0166355 A1 | * | 8/2005 | Tani | ...................... A47L 9/2852 15/319 |
| 2006/0076917 A1 | | 4/2006 | Lim | |
| 2007/0290828 A1 | | 12/2007 | Choi et al. | |

(Continued)

FOREIGN PATENT DOCUMENTS

| | | |
|---|---|---|
| CN | 101089556 A | 12/2007 |
| CN | 101089556 A | 5/2010 |

(Continued)

OTHER PUBLICATIONS

International Search Report in application No. PCT/CN2019/095146 dated Jul. 8, 2019.

(Continued)

*Primary Examiner* — Jeff A Burke
*Assistant Examiner* — Arslan Azhar
(74) *Attorney, Agent, or Firm* — Maschoff Brennan

(57) ABSTRACT

The embodiment of the present disclosure provides a robot control method, a robot and a storage medium. In the embodiment of the present disclosure, the robot determines a position when the robot is released from being hijacked based on relocalization operation; determines a task execution area according to environmental information around the position when the robot is released from being hijacked; and afterwards executes a task within the task execution area. Thus, the robot may flexibly determine the task execution area according to the environment in which the robot is released from being hijacked, without returning to the position when the robot is hijacked, to continue to execute the task, then acting according to local conditions is realized and the user requirements may be met as much as possible.

15 Claims, 7 Drawing Sheets

```
determining, by a robot, a position of the robot when the robot     ─ 101
is released from being hijacked based on relocalization operation

│
                                    ▼ determining, by the robot, a task execution area according to
environmental information around the position of the robot when    ─ 102
        the robot is released from being hijacked

│
                                    ▼ executing, by the robot, a task within the task execution area   ─ 103
```

(56) References Cited

U.S. PATENT DOCUMENTS

| | | | |
|---|---|---|---|
| 2012/0265391 A1* | 10/2012 | Letsky | G05D 1/0088 |
| | | | 701/25 |
| 2013/0138246 A1 | 5/2013 | Gutmann et al. | |
| 2013/0138247 A1 | 5/2013 | Gutmann et al. | |
| 2014/0031980 A1 | 1/2014 | Gutumann et al. | |
| 2016/0302638 A1* | 10/2016 | Haegermarck | A47L 11/24 |
| 2017/0332853 A1* | 11/2017 | Nam | A47L 9/0411 |
| 2018/0246518 A1* | 8/2018 | Vogel | G05D 1/0274 |
| 2018/0267552 A1* | 9/2018 | Artes | A47L 9/2805 |
| 2019/0094869 A1* | 3/2019 | Artes | G05D 1/0044 |
| 2019/0208979 A1* | 7/2019 | Bassa | G06K 9/00664 |
| 2020/0150655 A1* | 5/2020 | Artes | G05D 1/0016 |
| 2021/0096579 A1* | 4/2021 | Artes | G05D 1/0274 |

FOREIGN PATENT DOCUMENTS

| | | |
|---|---|---|
| CN | 104180799 A | 12/2014 |
| CN | 107969995 A | 5/2018 |
| CN | 108072370 A | 5/2018 |
| EP | 1868056 A2 | 5/2007 |
| EP | 1868056 A3 | 5/2007 |
| EP | 1868056 B1 | 5/2007 |
| EP | 1868056 A2 | 12/2007 |
| EP | 2447800 A2 | 5/2012 |
| FR | 2876467 A1 | 4/2006 |
| WO | 2013-071190 A1 | 5/2013 |
| WO | 2013071190 A1 | 5/2013 |

OTHER PUBLICATIONS

European Search Report dated Oct. 27, 2021 as received in application No. 19 836 995.1.

* cited by examiner

ROBOT CONTROL METHOD, ROBOT AND STORAGE MEDIUM

FIELD

The present disclosure relates to the technical field of artificial intelligence, and in particular to, a robot control method, a robot and a storage medium.

BACKGROUND

With the development of robot technologies, the robot gradually enters people's daily life, bringing great convenience to people's life. For example, the robot having floor cleaning functions may automatically the clean room, saving a lot of manpower and material costs thereby.

In the existing robot technology, autonomous localization and navigation of the robot may be realized by means of simultaneous localization and mapping (SLAM). However, in the process of SLAM, the robot may be hijacked sometimes. For example, the robot is moved, suspended or dragged by a wide range. When the robot returns back to the ground, uncontrollable drift errors will occur in the localization, and the robot needs to be relocated.

After relocalization, the robot will generally return back to the position being hijacked to continue to execute the previous task. This method is relatively simple, but cannot act according to local conditions and may not meet user requirements.

SUMMARY

Various aspects of the present disclosure provide a robot control method, a robot and a storage medium, such that the robot may execute corresponding tasks according to local conditions to meet user requirements.

The embodiment of the present disclosure provides a robot control method, including:

determining, by a robot, a position when the robot is released from being hijacked based on relocalization operation;

determining, by the robot, a task execution area according to environmental information around the position when the robot is released from being hijacked; and executing, by the robot, a task within the task execution area.

The embodiment of the present disclosure also provides a robot, including a mechanical body, where the mechanical body is provided with one or more sensors, one or more processors and one or more memories for storing computer instructions; and the one or more processors for executing the computer instructions for:

determining a position of the robot when the robot is released from being hijacked based on relocalization operation;

obtaining environmental information around the position when the robot is released from being hijacked through the one or more sensors; determining a task execution area according to the environmental information around the position of the robot when the robot is released from being hijacked; and controlling the robot to execute a task within the task execution area.

The embodiments of the present disclosure also provide a computer-readable storage medium storing computer instructions, when the computer instructions are executed by the one or more processors, the one or more processors are caused to execute the following actions including:

determining a position when the robot is released from being hijacked based on relocalization operation;

determining a task execution area according to the environmental information around the position when the robot is released from being hijacked; and controlling the robot to execute a task within the task execution area.

In the embodiment of the present disclosure, the robot determines a position when the robot is released from being hijacked based on relocalization operation; determines a task execution area according to environmental information around the position when the robot is released from being hijacked; and afterwards executes a task within the task execution area. Thus, the robot may flexibly determine the task execution area according to the environment in which the robot is released from being hijacked, without returning to the position when the robot is hijacked, to continue to execute the task, then acting according to local conditions is realized and the user requirements may be met as much as possible.

BRIEF DESCRIPTION OF THE DRAWINGS

The drawings described herein are used for further understanding of the present disclosure, and form a part thereof. The exemplary embodiments of the present disclosure and description thereof are used to explain the present disclosure, but not improperly limit thereto. In the drawings.

DETAILED DESCRIPTION OF EXAMPLE EMBODIMENTS

In order to make the object, technical solutions and advantages of the present disclosure clearer, the technical solutions of the present disclosure will be described clearly and completely below in conjunction with specific embodiments of the present disclosure and corresponding drawings. Apparently, the embodiments described are only some embodiments of the invention, but not all embodiments. All of the other embodiments, obtained by those of ordinary skill in the art based on the embodiments of the present disclosure without any inventive efforts, fall into the protection scope of the present disclosure.

With regard to the technical problem that the user requirements cannot be met since a method for an existing robot to continue to execute a task cannot act according to local conditions after the existing robot is relocated, the embodiment of the present disclosure provides a solution with the basic idea as follows: a robot determines a position of the robot when the robot is released from being hijacked based on relocalization operation; determines a task execution area according to environmental information around the position of the robot when the robot is released from being hijacked; and afterwards executes a task within the task execution area. Thus, the robot may flexibly determine the task execution area according to the environment in which the robot is released from being hijacked, then acting according to local conditions is realized and the user requirements may be met as much as possible.

The technical solutions provided by the embodiments of the present disclosure are described in detail below in combination with the accompanying drawings.

Figure 1:
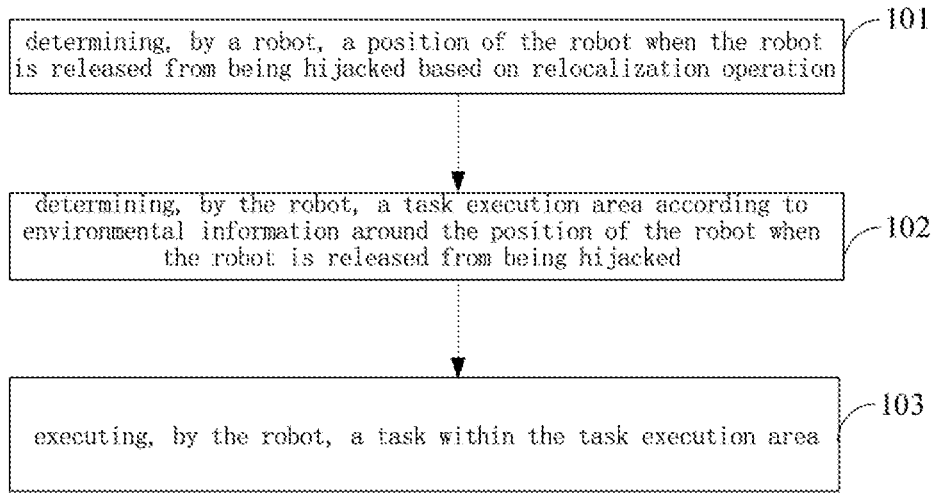
FIG. 1 is a flow diagram of a robot control method provided by an exemplary embodiment of the present disclosure.

FIG. 1 is a flow diagram of a robot control method provided by an exemplary embodiment of the present disclosure. As shown in FIG. 1, the method includes:

101, determining, by a robot, a position of the robot when the robot is released from being hijacked based on relocalization operation;

102, determining, by the robot, a task execution area according to environmental information around the position of the robot when the robot is released from being hijacked; and 103, executing, by the robot, a task within the task execution area.

The method provided by the embodiment may be applied to a robot capable of moving autonomously, and mainly controls subsequent behaviors of the robot after relocalization. This embodiment does not limit the shape of the robot, which may be, for example, circular, elliptical, triangular, convex polygonal and humanoid. Where, the robot may implement the logic of the robot localization method provided by the embodiment by installing software, APP, or writing program codes into corresponding devices.

In the embodiment, the robot may move autonomously, and complete certain job tasks on the basis of autonomous movement. For example, in shopping scenarios such as a supermarket or a mall, a shopping cart robot needs to follow a customer to move to accommodate goods selected by the customer. As another example, in warehousing sorting scenarios of some companies, a sorting robot needs to follow sorting personnel to move to a shelf picking area and then begins sorting order items. As another example, in a home sweeping scenario, a floor sweeping robot needs to sweep a living room, a bedroom, a kitchen and other areas. In these application scenarios, the robot completes corresponding job tasks in the autonomous movement process. However, in practical application, the robot may be trapped, repeatedly bypass or be wound and subjected to other running difficulties in the process of completing the corresponding job tasks. In this case, the user typically moves or drags the robot to another position such that the robot continues to execute the job task at that position.

In addition, the robot needs to be charged when the electric quantity is insufficient in this embodiment. When the electric quantity of the robot is insufficient, the robot may automatically move to a position of a charging station for charging. Or when the electric quantity of the robot is insufficient, the robot sounds a warning to the user such that the user moves the robot to the position of the charging station which charges the robot. After the robot is charged, the user moves or drags the robot to a position other than the charging station, such that the robot continues to execute the job task from the position.

In conjunction with the above-described application scenarios, it can be seen that the robot may be hijacked during the practical application, such as being moved, suspended, or dragged to another position as described above. In these cases, the robot may trigger relocalization operation due to the absence or loss of previous position information, that is, re-determine a pose of the robot, where the pose includes a position and an orientation of the robot.

In more cases, the robot is hijacked because when the robot is hijacked, the position of the robot is no longer suitable for the robot to continue to execute the task, and the robot needs to execute the task at a new position. Based on the analysis, in the embodiment, the robot may determine a position of the robot when the robot is released from being hijacked based on relocalization operation, obtain environmental information around the position of the robot when the robot is released from being hijacked, determine a task execution area according to the obtained environmental information, and afterwards execute a task within the task execution area. Thus, the robot may flexibly determine the task execution area according to the environment in which the robot is released from being hijacked, without returning to the position of the robot when the robot is hijacked, to continue to execute the task, then acting according to local conditions is realized and the user requirements may be met as much as possible.

In the embodiment of the present disclosure, the behaviors that the robot is moved, suspended or dragged by a wide range and the like are uniformly defined as that the robot is hijacked for convenience of description. Accordingly, the behaviors that the robot returns to the ground after being moved or suspended and the robot is stopped being dragged after being dragged are uniformly defined as that the robot is released from being hijacked.

Alternatively, a contact sensor, a reflective optical coupler, an inertial sensor, and the like may be provided on the robot, but are not limited thereto, for detecting whether the robot has a hijacked situation as described above. For example, the contact sensor may be provided at a bottom of a base of the robot or on a roller for detecting whether the robot is moved and suspended and for determining whether the robot returns back to the ground. Or, the reflective optical coupler is mounted at the bottom of the robot and emits a light beam capable of being reflected back from the ground, by means of which the operation of the robot being moved or suspended and subsequently placed back on the ground may be detected. When the contact sensor or the reflective optical coupler detects that the robot is separated from the ground, it indicates that the robot is hijacked; and when the contact sensor or the reflective optical coupler detects that the robot is placed back on the ground, it indicates that the robot is released from being hijacked, and the robot is triggered to start a relocalization function and execute relocalization operation. As another example, the inertial sensor such as an acceleration sensor is mounted on the robot for detecting whether the robot is dragged by a wide range. When the inertial sensor detects that the robot is dragged, it indicates that the robot is hijacked; and when the inertial sensor detects that the robot is stopped being dragged, it indicates that the robot is released from being hijacked, and the robot is triggered to start the relocalization function and execute the relocalization operation.

In an alternative embodiment, the robot may execute the relocalization operation at the position of the robot when the robot is released from being hijacked, and at the position, the pose of the robot in a stored environmental map may be accurately located. The pose herein includes the position and the orientation of the robot in the stored environmental map. Based on this, an alternative implementation of step 101 is as follows: when recognizing that the robot is released from being hijacked, the robot obtains environmental information around a current position of the robot; and locates the pose of the robot in the stored environmental map according to the environmental information around the current position of the robot, and takes the position in the pose as a position of the robot when the robot is released from being hijacked, to be precise, a position of the robot in the stored environmental map currently.

In another alternative embodiment, the robot cannot accurately locate the pose of the robot in the stored environmental map at the position of the robot when the robot is released from being hijacked, then the robot may move from the position of the robot when the robot is released from being hijacked to another position, and the robot continuously execute the relocalization operation according to the latest obtained environmental information in the moving process until the pose of the robot in the stored environmental map is accurately located. In the interest of description and differentiation, in the following embodiments of the present disclosure, the another position to which the robot moves from the position of the robot when the robot is released from being hijacked is defined as a second position which is any position in the stored environmental map that is different from the position of the robot when the robot is released from being hijacked. Based on this, another alternative implementation of step 101 is as follows: when recognizing that the robot is released from being hijacked, the robot moves from the current position of the robot to the second position and locates the pose of the robot in the stored environmental map in the moving process; and the robot, according to the position in the pose and data acquired in the moving process of the robot, determines the position where the robot starts moving as the position of the robot when the robot is released from being hijacked.

Alternatively, a localization period may be preset and a timer or counter may be started to time the localization period. Thus, in the process that the robot moves from the position of the robot when the robot is released from being hijacked to the second position, one-time relocalization operation may be executed when each localization period is reached, that is, relocalization is carried out one time, until the pose of the robot in the stored environmental map is located. Thus, when the pose of the robot is located, the elapsed time may be determined according to the total number of localization periods that the robot travels when moving from the position of the robot when the robot is released from being hijacked to the position of the robot when the pose of the robot in the stored environmental map is located.

Furthermore, a displacement sensor and the acceleration sensor may be provided on the robot, and the displacement and the acceleration of the robot are obtained in the process that the robot moves from the position of the robot when the robot is released from being hijacked to the position of the robot when the pose of the robot in the stored environmental map is located. Thus, with the combination of the displacement, the acceleration and the elapsed time of the robot, the traveling distance that the robot moves from the position of the robot when the robot is released from being hijacked to the position of the robot when the pose of the robot in the stored environmental map is located may be determined; and then according to the traveling distance of the robot, a known navigation path and the position of the robot when the pose of the robot in the stored environmental map being relocated, the position where the robot starts moving, that is, the position of the robot when the robot is released from being hijacked, is determined.

Alternatively, the environmental map may include at least one of a visual map and a grid map. The visual map, constructed on the basis of environmental images obtained by a visual sensor in advance, may describe a regional environment in which the robot is located to a certain extent, and mainly stores information of a plurality of environmental images related to the environment in which the robot is located, such as the pose of the robot corresponding to the environmental images, characteristic points contained in the environmental images and descriptors of the characteristic points. The grid map, constructed on the basis of environmental data obtained by a laser sensor in advance, is the product of digital rasterization of the environment in the area where the storage robot is located. Each grid in the grid map corresponds to a small area in the environment in which the robot is located and contains two types of basic information, namely coordinates and information about whether being occupied by obstacles or not, and the probability value of occupation of the grid represents the environmental information of the corresponding area. The greater the number of the grids in a grid map is, the more detailed the grid map describes the environment in which the robot is located, and accordingly, the higher the localization accuracy based on the grid map is.

If the sensor on the robot described above includes the visual sensor, in step 102, the visual sensor obtains environmental image around the position of the robot when the robot is released from being hijacked. Accordingly, the robot may determine the task execution area according to the environmental image around the position of the robot when the robot is released from being hijacked.

If the sensor on the robot described above includes the laser sensor, in the step 102, the laser sensor obtains environmental data around the position of the robot when the robot is released from being hijacked. Accordingly, the robot may determine the task execution area according to the environmental data around the position of the robot when the robot is released from being hijacked.

If the sensor on the robot described above includes the visual sensor and the laser sensor, in the step 102, the visual sensor obtains the environmental image around the position of the robot when the robot is released from being hijacked, and the laser sensor obtains the environmental data around the position of the robot when the robot is released from being hijacked. Accordingly, the robot may determine the task execution area according to the environmental image and the environmental data around the position of the robot when the robot is released from being hijacked.

For convenience of description, in the embodiments described above or below, the environmental image obtained by the visual sensor and the environmental data obtained by the laser sensor are collectively referred to as environmental information. Accordingly, in the embodiments described above or below, the environmental image around the position of the robot, obtained by the visual sensor and the environmental data around the position of the robot, obtained by the laser sensor when the robot is hijacked or released from being hijacked are collectively referred to as environmental information.

In more cases, after the robot is hijacked, the task needs to be executed from a new position. However, in some application scenarios, after the robot relocates its pose, the robot may need to return to the position of the robot when the robot is hijacked in order to continue to execute the task that has not been completed before the robot is hijacked. That is to say, depending on the hijacked situation of the robot, the behavior after the robot relocates its pose will be different. In order to more accurately control the behavior of the robot after relocalization, in some alternative embodiments, prior to step 102, whether the robot needs to execute the task at the position of the robot when the robot is released from being hijacked may be determined according to the difference between the position of the robot when the robot is released from being hijacked and the position of the robot when the robot is hijacked. If desired, the step 102 and subsequent operation are executed such that the robot executes a task from the position of the robot when the robot is released from being hijacked.

In an application scenario 1, the robot has completed the job task in a current environmental area or the user wants to move it to another environmental area to execute the job task. Thus, the user typically moves or drags the robot to any position in another area such that the robot executes the job task on the area from this position. For example, with regard to a sweeping robot applied to home sweeping operation, when the sweeping of a bedroom A is completed, the user moves the sweeping robot to a bedroom B to continue to execute the sweeping task. In the embodiment of the present disclosure, the environmental area refers to an area range with independent existence meaning, and generally speaking, the job tasks of the robots in different environmental areas may be independent of each other. Depending on the application scenarios, the division and definition of the environmental areas may vary. For example, in a home environment, bedrooms, kitchens, living rooms, toilets, etc. may be considered as relatively independent environmental areas, but are not limited thereto.

Based on the above-mentioned application scenario 1, an alternative implementation for determining whether a robot needs to execute a task at a position of the robot when the robot is released from being hijacked is as follows: whether the position of the robot when the robot is released from being hijacked and the position of the robot when the robot is hijacked belong to the same environmental area or not is judged; and if the position of the robot when the robot is released from being hijacked and the position of the robot when the robot is hijacked belong to different environmental areas, a situation that the robot needs to execute the task at the position of the robot when the robot is released from being hijacked is determined.

Alternatively, the position of the robot when the robot is hijacked may be determined based on the environmental information obtained in the last time or in the most recent time before the robot is hijacked.

In the application scenario 2, the robot may be trapped, repeatedly bypass or be wound and subjected to other running difficulties in the process of completing the corresponding job tasks. For example, when the sweeping robot executes a sweeping task at a current position, and a floor brush of the sweeping robot is wound by hairs at the position. As another example, when executing the sweeping task, the sweeping robot encounters a step and cannot continue operating, etc. In these cases, the user typically moves or drags the robot to another position such that the robot continues to execute the job task at the position. However, for some cases, a situation in which the robot has difficulty in running may be released. For example, in a case where the above-mentioned sweeping robot is moved away since the ground brush of the sweeping robot is wound by the hairs at the position when executing the sweeping task, the hairs may be cleaned when the robot returns back to the ground. In this case, the user expects the robot to return back to the position of the robot when the robot is hijacked to continue to execute the job task.

Based on the above-mentioned application scenario 2, another alternative implementation for determining whether a robot needs to execute a task at a position of the robot when the robot is released from being hijacked is as follows: whether the position of the robot when the robot is hijacked is located in a robot running difficulty area is judged; and if the position of the robot when the robot is hijacked is located in the robot running difficulty area and the position of the robot when the robot is released from being hijacked is located outside the robot running difficulty area, a situation that the robot needs to execute the task at the position of the robot when the robot is released from being hijacked is determined. Accordingly, if the position of the robot when the robot is hijacked is located outside the robot running difficulty area, a situation that the robot needs to return back to the position of the robot when the robot is hijacked to continue to execute the task is determined.

Alternatively, a foreseeable robot running difficulty area or a fixed running difficulty area, such as an environmental area in which steps are located, may be identified in the stored environmental map in advance; and the running difficulty areas may also be marked in real time according to the environmental information obtained by the robot. In the case of unforeseeable robot running difficulty areas or running difficulty areas with high variability, for example, in the case of a certain environmental area in which a large number of hairs, debris, etc. exist, the sweeping robot is possibly wound when executing a sweeping task in the environmental area, however, the hairs, debris, etc. in the environmental area may be cleaned, such that the environmental area is no longer the robot running difficulty area. Therefore, the robot may determine whether the environmental area is a running difficulty area for the robot or not according to the obtained environmental information.

In the application scenario 3, when the electric quantity of the robot is insufficient, the robot may automatically move to a position of a charging station for charging. Or when the electric quantity of the robot is insufficient, the robot sounds a warning to the user such that the user moves the robot to the position of the charging station which charges the robot. After the robot is charged, the user moves or drags the robot to a position other than the charging station, such that the robot continues to execute the job task from the position.

Based on the above-mentioned application scenario 3, still another alternative implementation for determining whether a robot needs to execute a task at a position of the robot when the robot is released from being hijacked is as follows: whether the position of the robot when the robot is hijacked is a charging station position is judged; and if the position of the robot when the robot is hijacked is the charging station position and the position of the robot when the robot is released from being hijacked is not a charging station position, in other words, the position of the robot when the robot is released from being hijacked is a non-charging station position, a situation that the robot needs to execute the task at the position of the robot when the robot is released from being hijacked is determined.

Alternatively, the position of the charging station may be pre-marked in the stored environmental map. Thus, when the robot detects that the robot has an external power supply for charging the robot, a situation that the position of the robot when the robot is hijacked is a position of the charging station may be determined.

Alternatively, when the robot is charged, a host circuit of the robot may be waked up periodically. When the host circuit of the robot is waked up, the robot may obtain surrounding environmental information of the current position, and determine the current position of the robot to be a charging station position according to the surrounding environmental information of the robot.

Figure 2:
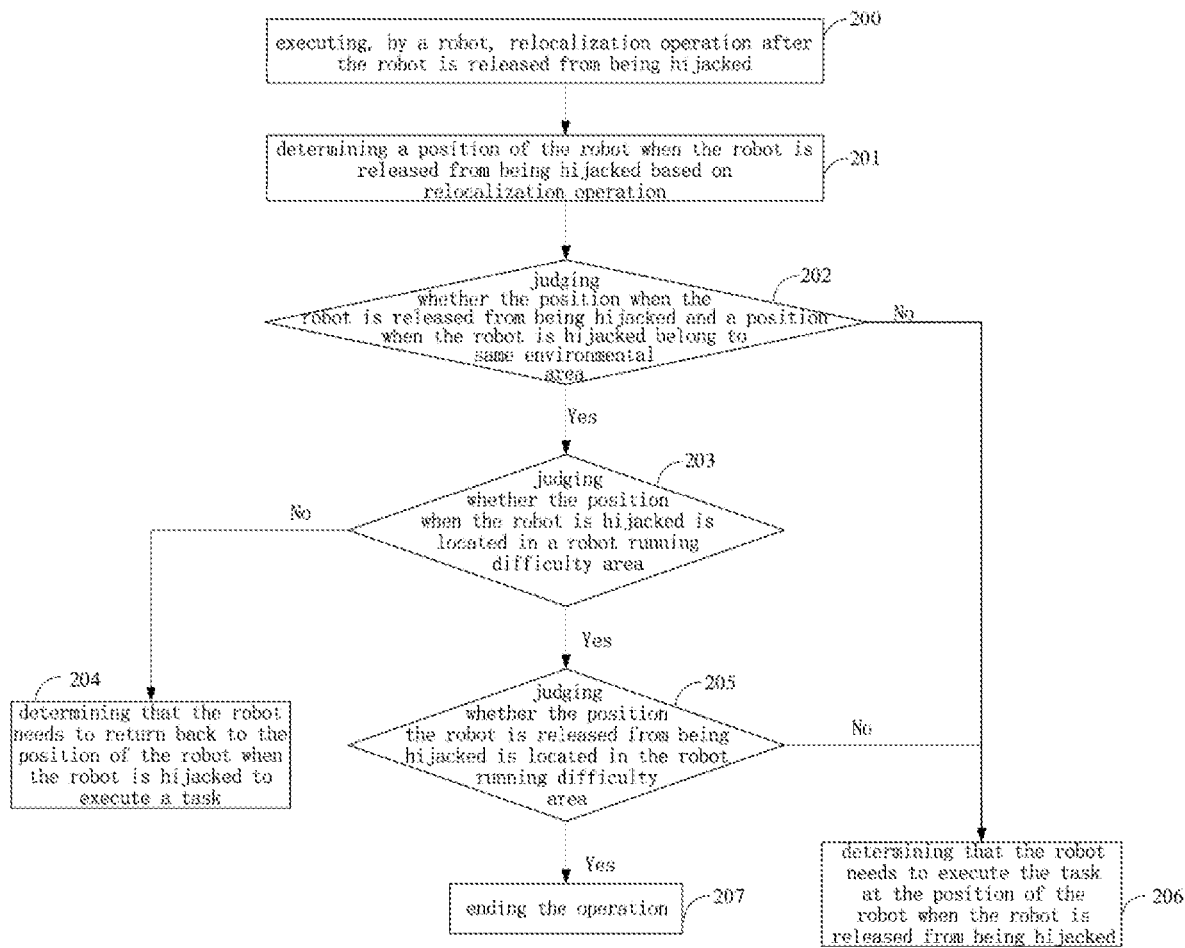
FIG. 2 is a flow diagram of a method for determining a position where a robot continues to execute a task provided by an exemplary embodiment of the present disclosure.

It should be noted that, in the embodiment of the present disclosure, the above-described implementations for determining whether a robot needs to execute a task at a position of the robot when the robot is released from being hijacked may be separately implemented, and any two or three of the above-described implementations may also be combined for judgment. The implementation for "judging whether the position of the robot when the robot is released from being hijacked and the position of the robot when the robot is hijacked belong to the same environmental area" and the implementation for "judging whether the position of the robot when the robot is hijacked is in a robot running difficulty area" will be implemented and exemplarily illustrated below, where a corresponding flow diagram of the implementations is shown in FIG. 2. As shown in FIG. 2, the method includes:

200, executing, by a robot, relocalization operation after the robot is released from being hijacked;

201, determining a position of the robot when the robot is released from being hijacked based on relocalization operation;

202, judging whether the position of the robot when the robot is released from being hijacked and a position of the robot when the robot is hijacked belong to a same environmental area; if yes, executing step 203; and if no, executing step 206;

203, judging whether the position of the robot when the robot is hijacked is located in a robot running difficulty area; if no, executing step 204; and if yes, executing step 205;

204, determining that the robot needs to return back to the position of the robot when the robot is hijacked to execute a task;

205, judging whether the position of the robot when the robot is released from being hijacked is located in the robot running difficulty area; if yes, ending the operation, namely executing step 207; and if no, executing the step 206;

206, determining that the robot needs to execute the task at the position of the robot when the robot is released from being hijacked; and 207, ending the operation.

The robot control method provided by the embodiment of the present disclosure is applicable to various types of robots, such as a sweeping robot, the sorting robot, a shopping guide robot and the shopping cart robot, but is not limited thereto.

The task execution areas of the robots vary for different types of robots. For example, for the sweeping robot, the task execution area determined by the sweeping robot in the step 102 is the to-be-swept area. Accordingly, an alternative implementation of the step 102 is as follows: the sweeping robot determines the to-be-swept area according to environmental information around a position of the sweeping robot when the sweeping robot is released from being hijacked.

As another example, for the sorting robots in warehouse sorting scenarios for some companies, in the step 102, the execution task areas determined by the sorting robots are to-be-sorted areas. Accordingly, another alternative implementation of the step 102 is as follows: the sorting robot determines the to-be-sorted area according to environmental information around a position of the sorting robot when the sorting robot is released from being hijacked.

Accordingly, for different types of robots, the specific implementations in which the task execution areas are determined and the manner in which the tasks are executed may vary depending on the application scenarios of the implementations. For example, the task executed by the sweeping robot is to sweep the floor and the like; the task executed by the shopping cart robot or the hopping guide robot is to follow a customer; and the task executed by the sorting robot is to sort goods or orders and the like. By taking the sweeping robot as an example and in combination with some application scenarios, the specific implementation for determining the to-be-swept area and the implementation for executing a sweeping task in the determined to-be-swept area are described below.

In an application scenario A, a table, a chair, a cabinet and the like are placed around a position of the sweeping robot when the sweeping robot is released from being hijacked. When the sweeping robot sweeps the areas where the table and the chair are located, the sweeping robot needs to bypass the positions of legs of the table and the chair to sweep the areas between the legs of the table and the chair. Based on such application scenario, an alternative implementation in which the sweeping robot determines the to-be-swept area is as follows: determining at least one physical object having a space limiting function in environmental information around a position of the sweeping robot when the sweeping robot is released from being hijacked; taking a ground area containing the at least one physical object as the to-be-swept area; and then executing a sweeping task in the to-be-swept area. For the above application scenario, the at least one physical object having the space limiting function may be, but is not limited to, the legs of the table and the chair, a wall, a cabinet, a pillar, a door frame, etc.

Figure 3A:
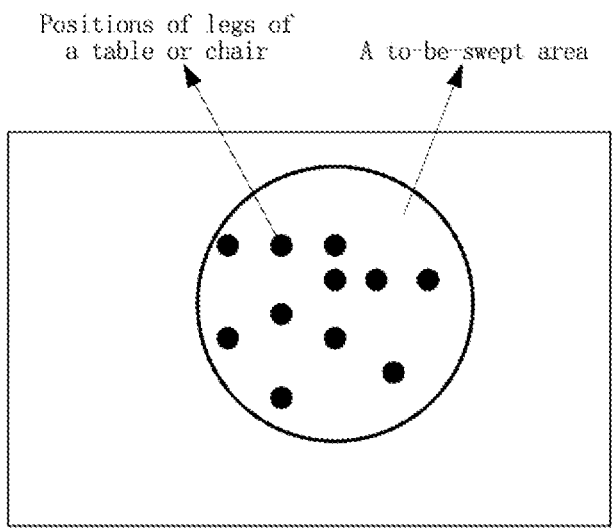
FIGS. 3a-3g are diagrams of to-be-swept areas provided by an exemplary embodiment of the present disclosure, respectively.
Figure 3B:
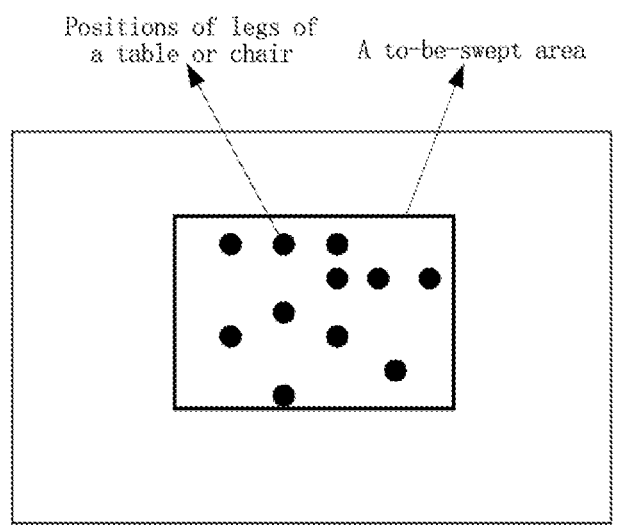

In order to make this alternative embodiment clearer, an exemplary description will be given in connection with the application scenario in which the table, chair and cabinet are placed around the position of the above-described sweeping robot when the sweeping robot is released from being hijacked. Firstly, the sweeping robot acquires environmental information around the position of the sweeping robot when the sweeping robot is released from being hijacked, and determines the positions of legs of all desks and chairs in the environmental area according to the acquired environmental information; then, according to the positions of the leg portions of the desks and chairs, the ground area containing the positions of the leg portions of the desks and chairs is determined to be the to-be-swept area. In the present embodiment, the shape of the to-be-swept area is not limited, and the to-be-swept area may be any area having a regular structure or an irregular structure including all the leg positions of the table and chair in the area. Alternatively, the to-be-swept area may be a circular area containing all the leg positions of the table and the chair in the area as shown in FIG. 3 or a rectangular area containing all the leg positions of the table and the chair in the area as shown in FIG. 3b, but is not limited thereto.

Figure 3C:
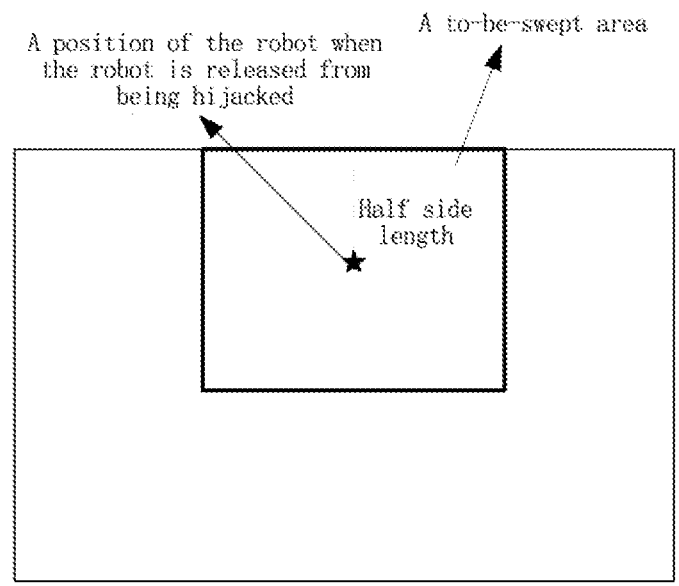

In an application scenario B, the environmental area where the sweeping robot is located when the sweeping robot is released from being hijacked may contain walls, cabinets and other facilities which have boundary defining functions. When the sweeping robot sweeps these boundary positions, the edges of the walls or cabinets are required to be swept in order to avoid a situation of missing a to-be-swept area due to long-distance bypass after such obstacles having boundary limiting functions are detected. Based on such application scenario, an alternative implementation in which the sweeping robot determines the to-be-swept area is as follows: the sweeping robot determines whether a current area where the sweeping robot is located contains a boundary, such as a wall and a cabinet, according to environmental information around a position of the sweeping robot when the sweeping robot is released from being hijacked; if boundary information is contained, as shown in FIG. 3c, a rectangular area is determined by taking a distance between the position of the robot when the robot is released from being hijacked and the boundary as any half side length, and the rectangular area is taken as the to-be-swept area; and a sweeping task is then executed in the to-be-swept area. Alternatively, the rectangular area includes a square area and a rectangle area. Here, in the embodiment of the present disclosure, half of the side length of one side of the rectangle is defined as a half side length.

Figure 3D:
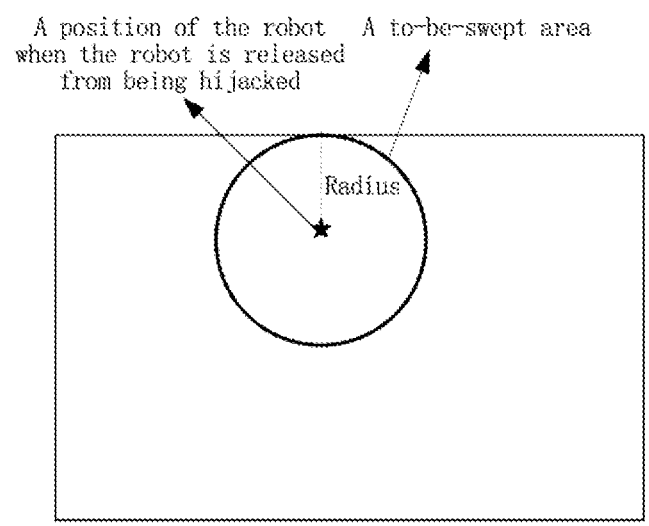

Alternatively, based on the above-mentioned application scenario B, an alternative implementation in which the sweeping robot determines the to-be-swept area is as follows: the sweeping robot determines whether a current area where the sweeping robot is located contains a boundary, such as a wall and a cabinet, according to the environmental information around the position of the sweeping robot when the sweeping robot is released from being hijacked; and if boundary information is contained, as shown in FIG. 3d, a rectangular area is determined by taking the distance between the position of the robot when the robot is released from being hijacked and the boundary as a radius, and the rectangular area is taken as the to-be-swept area.

It should be noted that in the embodiments described above or below, the distance between the position of the robot when the robot is released from being hijacked and the boundary may be the distance between the position of the robot when the robot is released from being hijacked and any point in the boundary, preferably, the perpendicular distance between the position of the robot when the robot is released from being hijacked and the boundary.

In an application scenario C, the environmental area where the sweeping robot is located when the sweeping robot is released from being hijacked may contain narrow areas such as corner formed between walls. Based on such application scenario, an alternative implementation in which the sweeping robot determines the to-be-swept area is as follows: the sweeping robot determines whether the current area where the sweeping robot is located contains a corner, such as the corner formed between the walls and the corner formed between the wall and the cabinet, according to the environmental information around the position of the sweeping robot when the sweeping robot is released from being hijacked; if the corner is contained, an associated area of the corner is determined as the to-be-swept area.

Figure 3E:
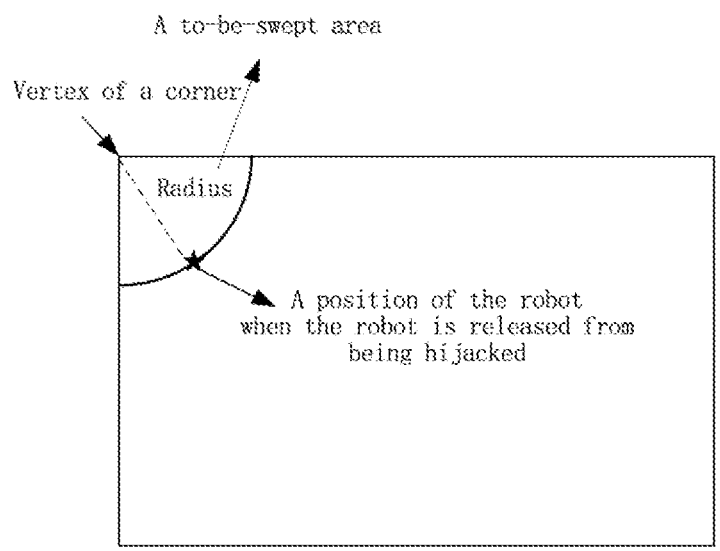

Furthermore, as shown in FIG. 3e, a sector area may be determined by taking the vertex of the corner as a circle center and a distance between the position of the robot when the robot is released from being hijacked and the vertex of the corner as a radius, where two edges of the corner are the other two boundaries of the sector area, and the sector area is taken as the to-be-swept area.

Figure 3F:
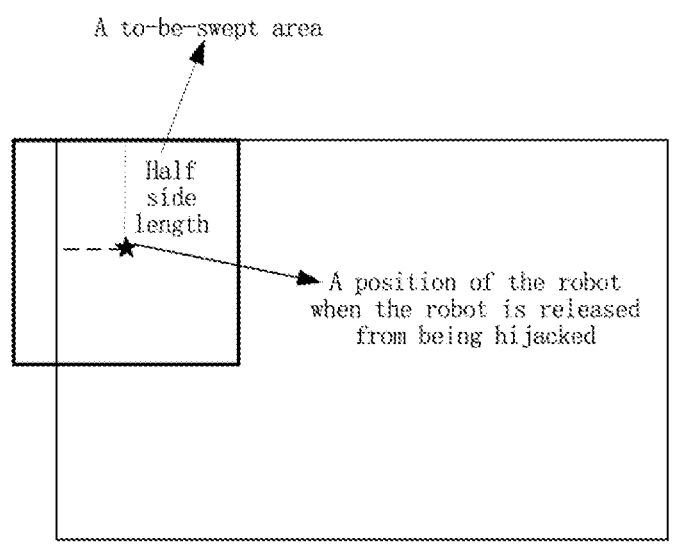

Alternatively, based on the application scenario C described above, an alternative implementation in which the sweeping robot determines the to-be-swept area is as follows: the sweeping robot determines whether a current area where the sweeping robot is located contains a corner, such as the corner formed between the walls and the corner formed between the wall and the cabinet, according to the environmental information around the position of the sweeping robot when the sweeping robot is released from being hijacked; and if the corner is contained, as shown in FIG. 3f, a rectangular area is determined by taking a distance from the position of the robot when the robot is released from being hijacked to any side of the corner as a half side length, and the rectangular area is taken as the to-be-swept area. Alternatively, the rectangular area includes a square area and a rectangle area. For a square area, preferably, the longest distance of the vertical distances from the side of the corner to the position of the robot when the robot is released from being hijacked is taken as a half side length.

Figure 3G:
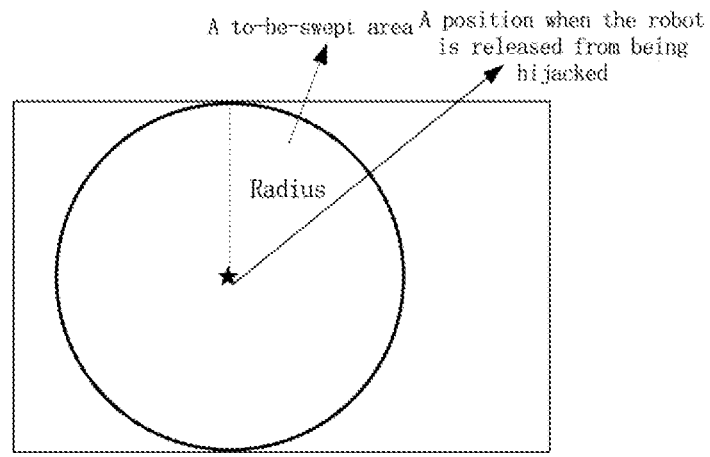

In an application scenario D, the environmental area of a position of the sweeping robot when the sweeping robot is released from being hijacked may be an open environment, which is free of obstacles such as walls, tables and chairs. For example, the sweeping robot sweeps in an empty room without any furniture, etc. Based on such application scenario, the robot determines any area as the to-be-swept area at the current position of the robot. For example, as shown in FIG. 3g, the robot may determine a circular area by taking the position of the robot when the robot is released from being hijacked as a circle center and by taking a distance from the position of the robot when the robot is released from being hijacked to the boundary of the environmental area as a radius, and take the circular area as the to-be-swept area. As another example, the robot may take the whole environmental area as the to-be-swept area by taking the boundary of the environmental area in which the robot is located when the robot is released from being hijacked as the boundary of the to-be-swept area.

In yet another alternative embodiment, after the sweeping robot determines the to-be-swept area, the sweeping robot executes the sweeping task in the to-be-swept area, and the sweeping robot may sweep the to-be-swept area in a random sweeping mode or a path planning sweeping mode. Compared with a random sweeping mode, the path planning type sweeping mode is a sweeping mode which may accurately plan a sweeping path, realize the planning type sweeping, ensure the sweeping path specification and avoid repeating as much as possible. The sweeping robot may support one or more different types of sweeping paths. For example, the sweeping robot may support a tightly packed rows sweeping path, a circular arc sweeping path, an "L-shaped" sweeping path, a rectangular sweeping path, a spiral walking spiral sweeping path, etc. In the embodiment of the present disclosure, exemplary description in which the sweeping robot carries out spiral sweeping and tightly packed rows sweeping on the to-be-swept area in the tightly packed rows sweeping path and the circular arc sweeping path is given.

Figure 4A:
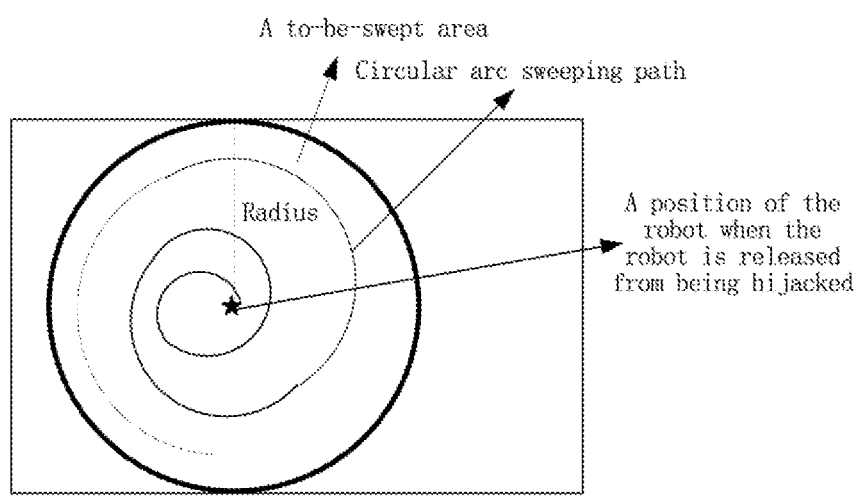
FIG. 4a is a diagram of a circular arc sweeping path provided by an exemplary embodiment of the present disclosure.

Based on the to-be-swept areas determined by the above-mentioned application scenarios A, B, C and D, the sweeping robot may select an adaptive sweeping mode to sweep the to-be-swept areas. Preferably, as shown in FIG. 4a, for a circular or circular arc area, the sweeping robot carries out spiral sweeping on the to-be-swept area in the circular arc sweeping path by taking the position of the sweeping robot when the sweeping robot is released from being hijacked as a circle center.

Figure 4B:
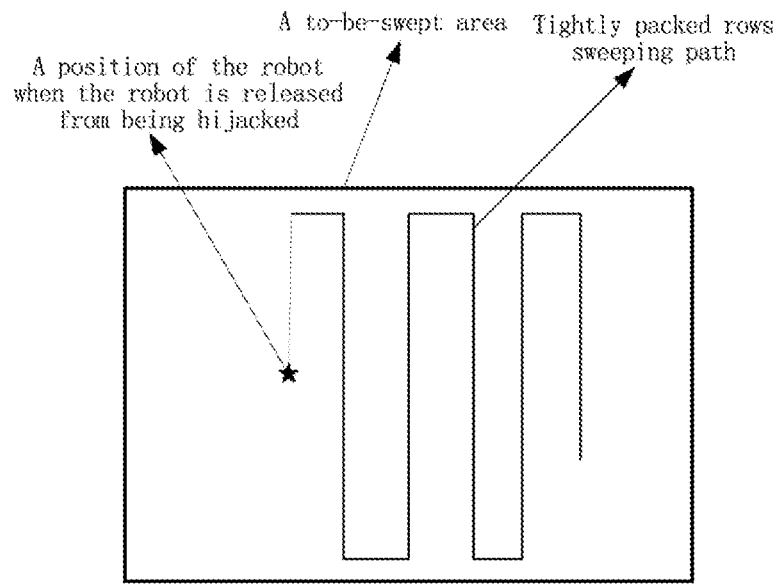
FIG. 4b is a diagram of a tightly packed rows sweeping path provided by an exemplary embodiment of the present disclosure.

Preferably, as shown in FIG. 4b, for the rectangular area, the sweeping robot carries out tightly packed rows sweeping on the to-be-swept area in the tightly packed rows sweeping path from the position of the sweeping robot when the sweeping robot is released from being hijacked. It should be noted that, in order to more clearly show the sweeping path in the tightly packed rows sweeping, the tightly packed rows sweeping manner shown in FIG. 4*b* does not reach the boundary of the to-be-swept area, but does not limit that the sweeping manner in the present disclosure cannot sweep the boundary.

It should be noted that execution bodies of the steps of the method provided by the above-described embodiments may be a same device, or the method may take different devices as the execution bodies. For example, the execution bodies of steps 201 and 202 may be a device A; as another example, the execution body of step 201 may be the device A, and the execution body of step 202 may be a device B; and so on.

In addition, in some of the flows described in the above-described embodiments and in the accompanying drawings, a plurality of operations occurring in a particular order are included, but it should be clearly understood that these operations may be executed out of the order in which they occur herein or executed in parallel, the sequence numbers of the operations, e.g., 201, 202, are merely used to distinguish between various operations and the sequence numbers themselves do not represent any order of execution. In addition, the flows may include more or fewer operations, which may be executed sequentially or in parallel. It should be noted that the description of "first", "second", etc. herein is intended to distinguish between different messages, devices, modules, etc., and is neither intended to represent a sequential order, nor to limit that "first" and "second" are of different types.

In addition to the embodiments of the method described above, some exemplary embodiments of the present disclosure provide robots suitable for use in the method described above. These methods are described in detail below with reference to the accompanying drawings.

Figure 5A:
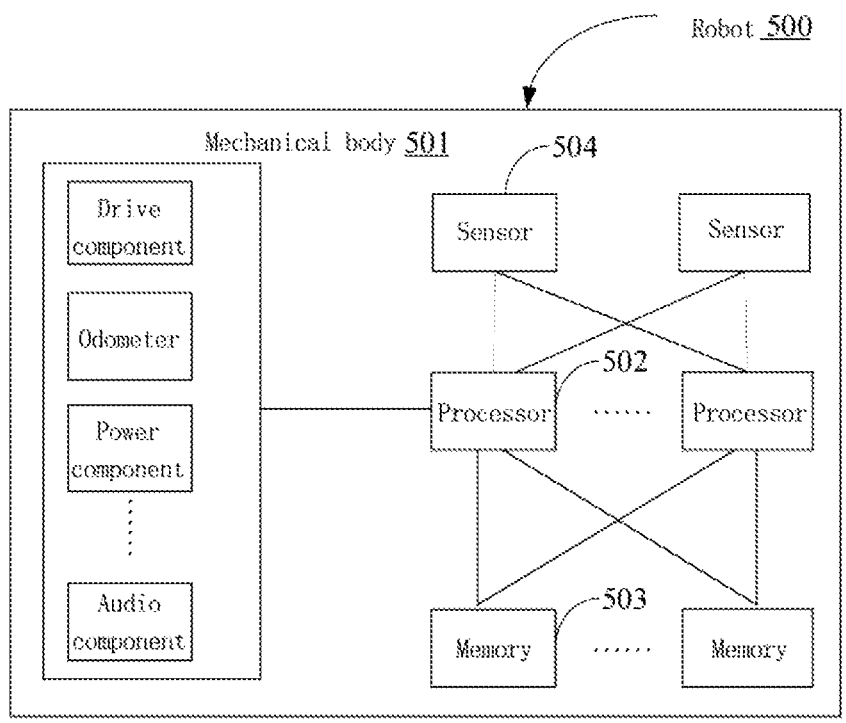
FIG. 5a is a block diagram of a hardware structure of a robot provided by an exemplary embodiment of the present disclosure.

FIG. 5*a* is a block diagram of a hardware structure of a robot provided by an exemplary embodiment of the present disclosure. As shown in FIG. 5*a*, the robot 500 includes: a mechanical body 501, where the mechanical body 501 is provided with one or more processors 502 and one or more memories 503 for storing computer instructions. In addition, one or more sensors 504 are provided on the mechanical body 501.

It should be noted that one or more processors 502, one or more memories 503, one or more sensors 504 may be provided inside the mechanical body 501 or on a surface of the mechanical body 501.

Figure 5B:
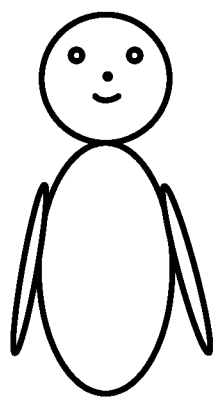
FIG. 5b is a line diagram of a humanoid robot provided by an exemplary embodiment of the present disclosure.
Figure 5C:
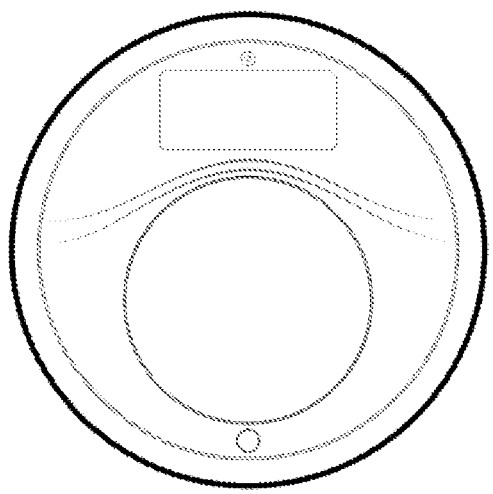
FIG. 5c is a line diagram of a non-humanoid robot provided by an exemplary embodiment of the present disclosure.

The mechanical body 501 is an execution mechanism of the robot 500, which may execute operations specified by one or more processors 502 in a defined environment. Where, the mechanical body 501 reflects to some extent the appearance of the robot 500. In the present embodiment, the appearance of the robot 500 is not limited. For example, the robot 500 may be a humanoid robot as shown in FIG. 5*b*, and the mechanical body 501 may include, but is not limited to: mechanical structures such as a head, hands, wrists, arms, a waist and a base of the robot. In addition, the robot 500 may also be a non-humanoid robot of a relatively simple configuration as shown in FIG. 5*c*, and the mechanical body 501 mainly refers to a body of the robot 500.

It should be noted that the mechanical body 501 is also provided with some basic components of the robot 500, such as a drive component, an odometer, a power component and an audio component. Alternatively, the drive component may include a drive wheel, a drive motor, a universal wheel, etc. These basic components and the constitution of the basic components which are contained in the different robots 500 are different, and the illustrated embodiments of the present disclosure are only a part of embodiments.

One or more memories 503 are primarily for storing one or more computer instructions that may be executed by one or more processors 502 to cause the one or more processors 502 to control the robot 500 to execute corresponding functions and complete corresponding actions or tasks. In addition to store computer instructions, one or more memories 503 may be for storing various other data to support operations on the robot 500. Examples of such data include instructions for any application or method operating on the robot 500, and an environmental map corresponding to the environment in which the robot 500 is located. Here, the environmental map may be one or more maps corresponding to the entire environment stored in advance, or may be a part of a map under construction previously.

One or more memories 503 may be implemented by any type of volatile or nonvolatile memory device or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

One or more processors 502, which may be considered a control system for the robot 500, may be used to execute computer instructions stored in one or more memories 503 to control the robot 500 to realize corresponding functions and execute corresponding actions or tasks. It should be noted that when the robot 500 is in different scenarios, the functions to be realized and the actions or tasks to be executed may differ; and accordingly, the computer instructions stored in the one or more memories 503 may vary, while the one or more processors 502 may control the robot 500 to realize different functions and execute different actions or tasks by executing different computer instructions.

In this embodiment, one or more sensors 504 on the robot 500 may assist the robot 500 in completing navigational localization, relocalization, etc. Where, one or more sensors 504 may include, but are not limited to, a visual sensor, a laser sensor, a contact sensor, a reflective optical coupler, an inertial sensor, and the like.

Where, the visual sensor may be viewed as an "eye" of the robot 500, primarily for obtaining image of the environment surrounding the robot 500, which may be referred to as environmental image. The visual sensor may be implemented using any device having an image obtaining function, such as a webcam and a camera.

Where, the laser sensor is a radar system that obtains environmental information around the robot 500 in a manner of emitting a laser beam. The environmental data obtained by the laser sensor may include, but is not limited to: distances, angles, etc. of objects around the robot 500. The laser sensor may be implemented using any device capable of emitting a laser beam, such as a laser radar.

In the embodiment, the robot 500 may move autonomously, and complete certain job tasks on the basis of autonomous movement. For example, in shopping scenarios such as a supermarket and a mall, a shopping cart robot needs to follow a customer to move to accommodate goods selected by the customer. As another example, in warehousing sorting scenarios of some companies, a sorting robot needs to follow sorting personnel to move to a shelf picking area and then begin sorting order items. As another example, in a home sweeping scenario, a floor sweeping robot needs to sweep a living room, a bedroom, a kitchen and other areas. In these application scenarios, the robot 500 completes corresponding job tasks in the autonomous movement process. However, in practical application, the robot 500 may be trapped, repeatedly bypass or be wound and subjected to other running difficulties in the process of completing the corresponding job tasks. In this case, the user typically moves or drags the robot 500 to another position such that the robot 500 continues to execute the job task at the position.

In addition, the robot 500 needs to be charged when the electric quantity insufficient in this embodiment. When the electric quantity of the robot 500 is insufficient, the robot 500 may automatically move to a position of a charging station for charging. Or when the electric quantity of the robot 500 is insufficient, the robot 500 sounds a warning to the user such that the user moves the robot to the position of the charging station which charges the robot 500. After the robot 500 is charged, the user moves or drags the robot 500 to a position other than the charging station, such that the robot 500 continues to execute the job task from the position.

In conjunction with the above-described application scenarios, it can be seen that the robot 500 may be hijacked during the practical application, such as being moved, suspended, or dragged to another position as described above. In these cases, the robot 500 may trigger relocalization operation due to the absence or loss of previous position information, that is, re-determine a pose of the robot 500, where the pose includes a position and an orientation of the robot.

In more cases, the robot 500 is hijacked because when the robot 500 is hijacked, the position of the robot 500 is no longer suitable for the robot 500 to continue to execute the task, and the robot 500 needs to execute the task at a new position. Based on the analysis, in the embodiment, one or more processors 502 may determine a position of the robot when the robot is released from being hijacked based on relocalization operation, obtain environmental information around the position of the robot when the robot is released from being hijacked through one or more sensors 504 and determine a task execution area according to the obtained environmental information, and afterwards control the robot 500 to execute a task within the task execution area. Thus, the task execution area may be flexibly determined according to the environment in which the robot is released from being hijacked without allowing the robot to return to the position of the robot when the robot is hijacked to continue to execute the task, then acting according to local conditions is realized and the user requirements may be met as much as possible.

Alternatively, one or more sensors 504 may include, but are not limited to, a contact sensor, a reflective optical coupler, an inertial sensor, and the like, and are used to detect whether the robot has a hijacked situation as described above. Where, the placement positions of the contact sensor, the reflective optical coupler and the inertial sensor on the robot 500, as well as the specific working principle thereof, may be described with reference to the embodiments of the method described above, and will not be described in detail herein.

In an alternative embodiment, one or more processors 502 may execute the relocalization operation at the position of the robot 500 when the robot 500 is released from being hijacked, and at the position, the pose of the robot 500 in a stored environmental map may be accurately located. The pose here includes the position and the orientation of the robot in the stored environmental map. Based on this, the one or more processors 502, when determining a position of the robot 500 when the robot 500 is released from being hijacked, are specifically for: when the robot 500 is identified to be released from being hijacked, obtaining environmental information around a current position of the robot 500 through one or more sensors 504; and locating a pose of the robot 500 in the stored environmental map according to the environmental information around the current position of the robot 500, and taking the position in the pose as the position of the robot 500 when the robot 500 is released from being hijacked, to be precise, a current position of the robot 500 in the stored environmental map.

In another alternative embodiment, if the one or more processors 502 are unable to accurately locate the pose of the robot 500 in the stored environmental map when the robot 500 is released from being hijacked, the robot 500 is controlled to move from the position of the robot 500 when the robot 500 is released from being hijacked to another position, and during the movement process, and the relocalization operation is continuously executed for repeated relocalization based on the latest surrounding environmental information obtained by one or more sensors 504 until the pose of the robot 500 in the stored environmental map is accurately located. Based on this, the one or more processors 502, when determining the position of the robot 500 when the robot 500 is released from being hijacked, are specifically for: when the robot 500 is recognized to be released from being hijacked, controlling the robot 500 is to move from the current position to a second position, and locate the pose of the robot 500 in the stored environmental map in the moving process; and according to the position in the pose and the data acquired in the moving process of the robot 500, determining the position at which the robot 500 starts moving as the position of the robot 500 when the robot 500 is released from being hijacked. For a specific implementation of how to determine a position of the robot 500 when the robot 500 is released from being hijacked, reference may be made to the related description of the embodiments of the method described above, which will not be described in detail herein.

Alternatively, the environmental map may include at least one of a visual map and a grid map. Where, for a detailed description of the visual map and the grid map, reference may be made to the related contents of the embodiments of the method described above, which will not be described in detail herein.

If the one or more sensors 504 include the visual sensor, the visual sensor obtains environmental images around the position of the robot 500 when the robot 500 is released from being hijacked. Accordingly, the task execution area may be determined according to the environmental images around the position of the robot 500 when the robot 500 is released from being hijacked.

If the one or more sensors 504 include the laser sensor, the laser sensor obtains environmental data around the position of the robot 500 when the robot 500 is released from being hijacked. Accordingly, the one or more processors 502 may determine the task execution area according to the environmental data around the position of the robot 500 when the robot 500 is released from being hijacked.

If the one or more sensors 504 include the visual sensor and the laser sensor, the visual sensor obtains the environmental images around the position of the robot 500 when the robot 500 is released from being hijacked, and the laser sensor obtains the environmental data around the position of the robot 500 when the robot 500 is released from being hijacked. Accordingly, the one or more processors 502 may determine the task execution area according to the environmental images and the environmental data around the position of the robot 500 when the robot 500 is released from being hijacked.

In more cases, after the robot 500 is hijacked, the task needs to be executed from a new position. However, in some application scenarios, after the robot 500 relocates its pose, the robot 500 may need to return to the position of the robot 500 when the robot 500 is hijacked in order to continue to execute the task that has not been completed before the robot 500 is hijacked. That is to say, depending on the hijacked situation of the robot 500, the behavior after the robot 500 relocates its pose will be different. In order to more accurately control the behavior after the robot 500 relocates its pose, in some alternative embodiments, the one or more sensors 102 may determine whether the robot 500 needs to execute the task at the position of the robot 500 when the robot 500 is released from being hijacked according to the difference between the position of the robot 500 when the robot 500 is released from being hijacked and the position of the robot 500 when the robot 500 is hijacked. If desired, the step and subsequent operations for determining the task execution area of the robot 500 are executed such that the robot 500 is controlled to execute the task from the position of the robot when the robot is released from being hijacked.

Based on above-mentioned the application scenario 1, the one or more processors 502, when determining whether a robot needs to execute a task at a position of the robot when the robot is released from being hijacked, are specifically for: judging whether the position of the robot 500 when the robot 500 is released from being hijacked and the position of the robot 500 when the robot 500 is hijacked belong to the same environmental area; and if the position of the robot 500 when the robot 500 is released from being hijacked and the position of the robot 500 when the robot 500 is hijacked belong to different environmental areas, determining that the robot 500 needs to execute the task at the position of the robot 500 when the robot 500 is released from being hijacked.

Alternatively, the position of the robot 500 when the robot 500 is hijacked may be determined based on the environmental information obtained by the one or more sensors 504 in the last time or in the most recent time before the robot 500 is hijacked.

Based on the application scenario 2, the one or more processors 502, when determining whether a robot needs to execute a task at a position of the robot when the robot is released from being hijacked, are specifically for: judging whether the position of the robot 500 when the robot 500 is hijacked is located in a robot running difficulty area; and if the position of the robot 500 when the robot 500 is hijacked is located in the robot running difficulty area and the position of the robot 500 when the robot 500 is released from being hijacked is located outside the robot running difficulty area, determining that the robot 500 needs to execute the task at the position of the robot when the robot is released from being hijacked. Accordingly, if the position of the robot 500 when the robot 500 is hijacked is outside the robot running difficulty area, a situation that the robot 500 needs to return back to the position of the robot 500 when the robot 500 is hijacked to continue to execute the task is determined.

For the determination of the robot running difficulty area, reference may be made to the related description of the embodiments of the method described above, which will not be described in detail herein.

Based on the above-mentioned application scenario 3, the one or more processors 502, when determining whether a robot needs to execute a task at a position of the robot when the robot is released from being hijacked, are specifically for: judging whether the position of the robot 500 when the robot 500 is hijacked is a charging station position; and if the position of the robot 500 when the robot 500 is hijacked is the charging station position and the position of the robot 500 when the robot 500 is released from being hijacked is not a charging station position, determining that the robot 500 needs to execute the task at the position of the robot 500 when the robot 500 is released from being hijacked.

For the judgment about whether the robot 500 is in the charging station position, reference may be made to the related contents in the embodiments of the method described above, which will not be described in detail herein.

The robot provided by the embodiment of the present disclosure may be various types of robots, such as the sweeping robot, the sorting robot, the shopping guide robot and the shopping cart robot, but is not limited thereto.

The task execution areas of the robots vary for different types of robots. For example, for the sweeping robot, the task execution area of the sweeping robot is a to-be-swept area. Accordingly, the one or more processors 502 on the sweeping robot, when determining the task execution area of the robot, are specifically for: determining the to-be-swept area according to the environmental information around the position of the sweeping robot when the sweeping robot is released from being hijacked.

Accordingly, for different types of robots, the specific implementations in which the corresponding task execution areas are determined by the one or more processors 502 and manners in which the tasks are executed may vary depending on the application scenarios of the implementations. For example, the task executed by the sweeping robot is to sweep the floor and the like; the task executed by the shopping cart robot or the hopping guide robot is to follow a customer; and the task executed by the sorting robot is to sort goods or orders and the like. By taking the sweeping robot as an example and in combination with some application scenarios, the specific implementation for determining the to-be-swept area and the implementation for controlling the sweeping robot to execute a sweeping task in the determined to-be-swept area by the one or more processors 502 are described below.

Based on the above-mentioned application scenario A, the one or more processors 502, when determining the to-be-swept area, are specifically for:

determining at least one physical object having a space limiting function in environmental information around a position of the sweeping robot when the sweeping robot is released from being hijacked; taking a ground area containing the at least one physical object as the to-be-swept area; and then controlling the sweeping robot to execute a sweeping task in the to-be-swept area. For the above-mentioned application scenarios, the at least one physical object having the space limiting function on the to-be-swept area may be, but is not limited to, the legs of the table and the chair, a wall, a cabinet, a pillar, a door frame, etc.

Based on the above-mentioned application scenario B, the one or more processors 502, when determining the to-be-swept area, are specifically for: determining whether a current area where the sweeping robot is located contains a boundary, such as a wall and a cabinet, according to environmental information around a position of the sweeping robot when the sweeping robot is released from being hijacked; if boundary information is contained, determining a rectangular area by taking the distance between the position of the robot when the robot is released from being hijacked and the boundary as any half side length, and take the rectangular area as the to-be-swept area; and then controlling the sweeping robot to execute a sweeping task in the to-be-swept area.

Alternatively, based on the above-mentioned application scenario B, the one or more processors 502, when determining the to-be-swept area, are specifically for: determining, by the sweeping robot, whether a current area where the sweeping robot is located contains a boundary, such as a wall and a cabinet, according to the environmental information around the position of the sweeping robot when the sweeping robot is released from being hijacked; and if boundary information is contained, determining a rectangular area by taking the distance between the position of the robot when the robot is released from being hijacked and the boundary as a radius and taken the rectangular area as the to-be-swept area.

Based on the above-mentioned application scenario C, the one or more processors 502, when determining the to-be-swept area, are specifically for: determining whether the current area where the sweeping robot is located contains a corner, such as the corner formed between the walls and the corner formed between the wall and the cabinet, according to the environmental information around the position of the sweeping robot when the sweeping robot is released from being hijacked; and if the corner is contained, determining an associated area of the corner as the to-be-swept area.

Furthermore, a sector area may be determined by taking the vertex of the corner as a circle center and a distance from the position of the robot when the robot is released from being hijacked to the vertex of the corner as a radius, where two edges of the corner are the other two boundaries of the sector area, and the sector area is taken as the to-be-swept area.

Alternatively, based on the above-mentioned application scenario C, the one or more processors 502, when determining the to-be-swept area, are specifically for: determining whether the current area where the sweeping robot is located contains a corner, such as the corner formed between the walls and the corner formed between the wall and the cabinet, according to the environmental information around the position of the sweeping robot when the sweeping robot is released from being hijacked; and if the corner is contained, determining a rectangular area by taking a distance from the position of the robot when the robot is released from being hijacked to any side of the corner as a half side length, and taking the rectangular area as the to-be-swept area.

Based on the above-mentioned application scenario D, any area is determined as the to-be-swept area at the current position of the robot. For example, a circular area, determined by taking the position of the sweeping robot when the sweeping robot is released from being hijacked as a circle center and by taking the distance from the position of the sweeping robot when the sweeping robot is released from being hijacked to the boundary of the environmental area as a radius, may act as the to-be-swept area. As another example, the whole environmental area may be taken as the to-be-swept area by taking the boundary of the environmental area where the sweeping robot is located when the sweeping robot is released from being hijacked as the boundary of the to-be-swept area.

In yet another alternative embodiment, after the to-be-swept area is determined, the one or more processors 502 control the sweeping robot to execute the sweeping task in the to-be-swept area, and may control the sweeping robot to sweep the to-be-swept area in a random sweeping mode or a path planning sweeping mode. The sweeping robot may support one or more different types of sweeping paths. For example, the sweeping robot may support a tightly packed rows sweeping path, a circular arc sweeping path, an "L-shaped" sweeping path, a rectangular sweeping path, a spiral walking spiral sweeping path, etc. In the embodiment of the present disclosure, exemplary description in which the sweeping robot carries out spiral sweeping and tightly packed rows sweeping on the to-be-swept area in the tightly packed rows sweeping path and the circular arc sweeping path is given.

Based on the to-be-swept areas determined by the above-mentioned application scenarios A, B, C and D, the one or more processors 502 may select adaptive sweeping modes to control the sweeping robot to sweep the to-be-swept areas. Preferably, as shown in FIG. 4*a*, for a circular or circular arc area, the one or more processors 502, when controlling the robot to execute a task within the task execution area, are specifically for: controlling the sweeping robot to carry out spiral sweeping on the to-be-swept area in the circular arc sweeping path by taking the position of the sweeping robot when the sweeping robot is released from being hijacked as a circle center.

Preferably, as shown in FIG. 4*b*, for the rectangular area, the one or more processors 502, when controlling the robot to execute a task in the task execution area, are specifically for: controlling the sweeping robot to carry out tightly packed rows sweeping on the to-be-swept area in the tightly packed rows sweeping path from the position of the sweeping robot when the sweeping robot is released from being hijacked.

Accordingly, the embodiments of the present disclosure also provide a computer-readable storage medium storing computer instructions, where when the computer instructions are executed by the one or more processors, the one or more processors are caused to execute the following actions including:

determining a position of the robot when the robot is released from being hijacked based on relocalization operation of the robot; determining a task execution area according to environmental information around the position of the robot when the robot is released from being hijacked; and controlling the robot to execute a task within the task execution area.

In an alternative implementation, the above-described action for determining the position of the robot when the robot is released from being hijacked includes: when recognizing that the robot is released from being hijacked, acquiring environmental information around a current position of the robot; and locating the pose of the robot in the stored environmental map according to the environmental information around the current position of the robot, and taking the position in the pose as the position of the robot when the robot is released from being hijacked, to be precise, a position of the robot in the stored environmental map currently.

In an alternative implementation, the above-described action for determining the position of the robot when the robot is released from being hijacked further includes: when recognizing that the robot is released from being hijacked, controlling the robot to move from the current position of the robot to a second position and locating the pose of the robot in the stored environmental map in the moving process; and according to the position in the pose and data acquired in the moving process of the robot, determining the position where the robot starts moving as the position of the robot when the robot is released from being hijacked.

In an alternative embodiment, the actions executed by the one or more processors further include: determining that the robot needs to execute the task at the position of the robot when the robot is released from being hijacked according to the difference between the position of the robot when the robot is released from being hijacked and the position of the robot when the robot is hijacked.

In an alternative embodiment, the action for determining that the robot needs to execute the task at the position of the robot when the robot is released from being hijacked includes: if the position of the robot when the robot is released from being hijacked and the position of the robot when the robot is hijacked belong to different environmental areas, determining that the robot needs to execute the task at the position of the robot when the robot is released from being hijacked.

In an alternative embodiment, the action for determining that the robot needs to execute the task at the position of the robot when the robot is released from being hijacked further includes: if the position of the robot when the robot is hijacked is located in the robot running difficulty area and the position of the robot when the robot is released from being hijacked is located outside the robot running difficulty area, determining that the robot needs to execute the task at the position of the robot when the robot is released from being hijacked.

In an alternative embodiment, the action for determining that the robot needs to execute the task at the position of the robot when the robot is released from being hijacked further includes: if the position of the robot when the robot is hijacked is the charging station position and the position of the robot when the robot is released from being hijacked is not a charging station position, determining that the robot needs to execute the task at the position of the robot when the robot is released from being hijacked.

The readable storage medium provided by the embodiment is suitable for various types of robots, for example, the sweeping robot, the sorting robot, the shopping guide robot and the shopping cart robot, but the robots are not limited thereto.

For different types of robots, the instructions stored in the readable storage medium for determining the task execution areas and executing the tasks may be different, such that one or more processors execute different job tasks when executing these instructions Exemplary description in the example of the sweeping robot is given below.

In an alternative embodiment, with regard to the sweeping robot, the action for determining the task execution area includes: determining the to-be-swept area according to the environmental information around the position of the sweeping robot when the sweeping robot is released from being hijacked.

In an alternative embodiment, the action for determining the to-be-swept area includes: determining at least one physical object having a space limiting function in the environmental information around the position of the sweeping robot when the sweeping robot is released from being hijacked; and taking a ground area containing the at least one physical object as the to-be-swept area.

In an alternative embodiment, the action for determining the to-be-swept area further includes: recognizing whether the environmental information around the position of the sweeping robot when the sweeping robot is released from being hijacked contains a corner; and if the corner is contained, determining an associated area of the corner as the to-be-swept area.

In an alternative embodiment, the above-mentioned action for determining the associated area of the corner as the to-be-swept area includes: determining a sector area by taking the vertex of the corner as a circle center and a distance from the position of the sweeping robot when the sweeping robot is released from being hijacked to the vertex as a radius and taking the sector area as the to-be-swept area; or determining a rectangular area by taking a distance from the position of the robot when the robot is released from being hijacked to any side of the corner as a half side length, and taking the rectangular area as the to-be-swept area.

In an alternative embodiment, for the sweeping robot, the above-mentioned action for controlling the robot to execute the task in the task execution area includes: controlling the sweeping robot to carry out spiral sweeping on the to-be-swept area by taking the position of the sweeping robot when the sweeping robot is released from being hijacked as a circle center; or controlling the sweeping robot to carry out tightly packed rows sweeping on the to-be-swept area from the position of the sweeping robot when the sweeping robot is released from being hijacked.

Those skilled in the art should understand that the embodiments of the present application may be provided as a method, a system or a computer program product. Thus, forms of complete hardware embodiments, complete software embodiments or embodiments integrating software and hardware may be adopted in the present application. Moreover, the form of a computer program product implemented on one or more computer available storage media (including, but not limited to, a disk memory, a CD-ROM, an optical memory and the like) containing computer available program codes may be adopted in the present application.

The present application is described with reference to flowcharts and/or block diagrams of the method, the device (system) and the computer program product according to the embodiments of the present application. It will be understood that each flow and/or block in the flowcharts and/or block diagrams and a combination of the flows and/or blocks in the flowcharts and/or block diagrams may be implemented by computer program instructions. These computer program instructions may be provided for a processor of a general-purpose computer, a dedicated computer, an embedded processor or other programmable data processing devices to generate a machine, so that an apparatus for achieving functions designated in one or more flows of the flowcharts and/or one or more blocks of the block diagrams is generated via instructions executed by the processor of the computers or the other programmable data processing devices.

These computer program instructions may also be stored in a computer-readable memory capable of guiding the computers or the other programmable data processing devices to work in a specific manner, so that a manufactured product including an instruction apparatus is generated via the instructions stored in the computer-readable memory, and the instruction apparatus achieves the functions designated in one or more flows of the flowcharts and/or one or more blocks of the block diagrams.

These computer program instructions, which can also be loaded onto the computers or the other programmable data processing devices, enable the computers to implement a series of operation steps on the computers or the other programmable devices; therefore, the instructions executed on the computers or the other programmable devices provide a step of achieving the functions designated in one or more flows of the flowcharts and/or one or more blocks of the block diagrams.

In a typical configuration, a computing device includes one or more processors (CPUs), an input/output interface, a network interface, and a memory.

The memory may include a non-permanent memory, a random access memory (RAM), and/or a non-volatile memory in a computer-readable medium, such as a read-only memory (ROM) or a flash RAM. The memory is an example of a computer-readable medium.

The computer-readable medium includes permanent and non-permanent, mobile and non-mobile media, which may implement information storage by any method or technology. The information may be a computer-readable instruction, a data structure, a program module, or other data. Examples of computer storage media include, but are not limited to, a phase change RAM (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disk (DVD) or other optical memories, a magnetic tape cartridge, a magnetic tape storage device or other magnetic storage devices or any other non-transmission media, which may be used to store information accessible by a computing device. As defined herein, the computer-readable medium does not include transitory computer-readable media such as modulated data signals and carrier waves.

It should also be noted that the terms "including", "containing" or any other variations thereof are intended to encompass a non-exclusive inclusion, such that a process, method, item or device including a series of elements includes not only those elements but also other elements not explicitly listed, or elements that are inherent to such process, method, item or device. In the absence of more restrictions, an element defined by the phrase "including one . . . " does not exclude the existence of additional identical elements in the process, method, item or device that includes the element.

The above is only the embodiments of the present application, and not intended to limit the present application. As will occur to those skilled in the art, the present application is susceptible to various modifications and changes. Any modifications, equivalent replacements, improvements and the like made within the spirit and principle of the present application shall fall within the scope of protection of the present application.

What is claimed is:

1. A robot control method, comprising:
   determining, by a robot, a position when the robot is released from being hijacked based on relocalization operation;
   determining, by the robot, according to environmental information around the position when the robot is released from being hijacked, the position when the robot is released from being hijacked as a position to continue a task executed before the robot being hijacked and a task area to be executed; and
   executing, by the robot, the task within the task area to be executed;
   wherein the environmental information is obtained by sensor provided on the robot;
   wherein the robot is a sweeping robot, and the determining, by the robot, the task area to be executed according to the environmental information around the position when the robot is released from being hijacked, comprises:
   determining, by the sweeping robot, a to-be-swept area according to the environmental information around the position when the sweeping robot is released from being hijacked;
   wherein the determining, by the sweeping robot, the to-be-swept area according to the environmental information around the position when the sweeping robot is released from being hijacked, further comprises:
   recognizing whether the environmental information around the position when the sweeping robot is released from being hijacked contains a corner;
   and if the corner is contained, determining an associated area of the corner as the to-be-swept area;
   and wherein the determining the associated area of the corner as the to-be-swept area comprises:
   determining a sector area by taking a vertex of the corner as a circle center and a distance from the position when the sweeping robot is released from being hijacked to the vertex of the corner as a radius, and taking the sector area as the to-be-swept area; or
   determining a rectangular area by taking a distance from the position when the sweeping robot is released from being hijacked to any side of the corner as a half side length, and taking the rectangular area as the to-be-swept area.

2. The robot control method according to claim 1, wherein the determining, by the robot, the position when the robot is released from being hijacked based on the relocalization operation, comprises:
   obtaining the environmental information around a current position when the robot recognizes that the robot is released from being hijacked; and
   locating a pose of the robot in a stored environmental map according to the environmental information around the current position, and taking a position in the pose as the position when the robot is released from being hijacked.

3. The robot control method according to claim 1, wherein the determining, by the robot, the position when the robot is released from being hijacked based on the relocalization operation, comprises:
   moving from the current position to a second position when the robot recognizes that the robot is released from being hijacked, and locating the pose of the robot in a stored environmental map in a moving process; and
   determining a position where the robot starts moving as the position when the robot is released from being hijacked, according to a position in the pose and data acquired in the moving process.

4. The robot control method according to claim 1, wherein prior to the determining, by the robot, the task area to be executed according to the environmental information around the position when the robot is released from being hijacked, further comprises:
   determining that the robot needs to execute the task at the position when the robot is released from being hijacked according to a difference between the position when the robot is released from being hijacked and a position when the robot is hijacked.

5. The robot control method according to claim 4, wherein the determining that the robot needs to execute the task at the position when the robot is released from being hijacked according to the difference between the position when the robot is released from being hijacked and the position when the robot is hijacked comprises at least one of situations as follows:

if the position when the robot is released from being hijacked and the position when the robot is hijacked belong to different environmental areas, determining that the robot needs to execute the task at the position when the robot is released from being hijacked;

if the position when the robot is hijacked is located in a robot running difficulty area and the position when the robot is released from being hijacked is located outside the robot running difficulty area, determining that the robot needs to execute the task at the position when the robot is released from being hijacked; and if the position when the robot is hijacked is a charging station position and the position when the robot is released from being hijacked is not a charging station position, determining that the robot needs to execute the task at the position when the robot is released from being hijacked.

6. The robot control method according to claim 1, wherein the determining, by the sweeping robot, the to-be-swept area according to the environmental information around the position when the sweeping robot is released from being hijacked, comprises:

determining at least one physical object having a space limiting function in the environmental information around the position when the sweeping robot is released from being hijacked; and taking a ground area containing the at least one physical object as the to-be-swept area.

7. The robot control method according to claim 1, wherein the executing the task by the robot within the task area to be executed, comprises:

carrying out, by the sweeping robot, spiral sweeping on the to-be-swept area by taking the position when the sweeping robot is released from being hijacked as a circle center; or carrying out, by the sweeping robot, tightly packed rows sweeping on the to-be-swept area from the position when the sweeping robot is released from being hijacked.

8. A robot, comprising: a mechanical body, wherein the mechanical body is provided with one or more sensors, one or more processors and one or more memories for storing computer instructions; and the one or more processors for executing the computer instructions for:

determining a position when the robot is released from being hijacked based on relocalization operation;

obtaining environmental information around the position when the robot is released from being hijacked through the one or more sensors;

determining the position when the robot is released from being hijacked as a position to continue a task executed before the robot being hijacked and a task area to be executed according to the environmental information around the position when the robot is released from being hijacked; and controlling the robot to execute the task within the task area to be executed;

the robot is a sweeping robot, and the one or more processors, when determining the task area to be executed, specifically for:

determining a to-be-swept area according to the environmental information around the position when the sweeping robot is released from being hijacked;

the one or more processors, when determining the to-be-swept area, specifically for:

recognizing whether the environmental information around the position when the sweeping robot is released from being hijacked contains a corner;

and if the corner is contained, determining an associated area of the corner as the to-be-swept area;

the one or more processors, when determining the associated area of the corner as the to-be-swept area, specifically for:

determining a sector area by taking a vertex of the corner as a circle center and a distance from the position when the sweeping robot is released from being hijacked to the vertex of the corner as a radius, and taking the sector area as the to-be-swept area; or determining a rectangular area by taking a distance from the position when the sweeping robot is released from being hijacked to any side of the corner as a half side length, and taking the rectangular area as the to-be-swept area.

9. The robot according to claim 8, the one or more processors, when determining the position when the robot is released from being hijacked, specifically for:

obtaining the environmental information around a current position of the robot through the one or more sensors when the robot is recognized to be released from being hijacked; and locating a pose of the robot in a stored environmental map according to the environmental information around the current position, and taking a position in the pose as the position when the robot is released from being hijacked.

10. The robot according to claim 8, the one or more processors, when determining the position when the robot is released from being hijacked, specifically for:

controlling the robot to move from the current position to a second position when the robot is recognized to be released from being hijacked, and locating the pose of the robot in a stored environmental map in a moving process; and determining a position where the robot starts moving as the position when the robot is released from being hijacked, according to the position in the pose and data acquired in the moving process.

11. The robot according to claim 8, the one or more processors, when determining the task area to be executed, specifically for:

determining that the robot needs to execute the task at the position when the robot is released from being hijacked according to a difference between the position when the robot is released from being hijacked and a position when the robot is hijacked.

12. The robot according to claim 11, the one or more processors, when determining that the robot needs to execute the task at the position when the robot is released from being hijacked, are specifically for executing one of the following actions:

if the position when the robot is released from being hijacked and a position when the robot is hijacked belong to different environmental areas, determining that the robot needs to execute the task at the position when the robot is released from being hijacked;

if the position when the robot is hijacked is located in a robot running difficulty area and the position when the robot is released from being hijacked is located outside the robot running difficulty area, determining that the robot needs to execute the task at the position when the robot is released from being hijacked; and if the position when the robot is hijacked is a charging station position and the position when the robot is released from being hijacked is not a charging station position, determining that the robot needs to execute the task at the position when the robot is released from being hijacked.

13. The robot according to claim 8, the one or more processors, when determining the to-be-swept area, specifically for:

determining at least one physical object having a space limiting function in the environmental information around the position when the sweeping robot is released from being hijacked; and taking a ground area containing the at least one physical object as the to-be-swept area.

14. The robot according to claim 8, the one or more processors, when controlling the robot to execute the task within the task area to be executed, specifically for:

controlling the sweeping robot to carry out spiral sweeping on the to-be-swept area by taking the position when the sweeping robot is released from being hijacked as a circle center; or controlling the sweeping robot to carry out tightly packed rows sweeping on the to-be-swept area from the position when the sweeping robot is released from being hijacked.

15. A computer-readable storage medium storing computer instructions, when the computer instructions are executed by one or more processors, the one or more processors are caused to execute the following actions comprising:

determining a position when a robot is released from being hijacked based on relocalization operation of the robot;

determining the position when the robot is released from being hijacked as a position to continue a task executed before the robot being hijacked and a task area to be executed according to environmental information around the position when the robot is released from being hijacked; and controlling the robot to execute the task within the task area to be executed;

wherein the robot is a sweeping robot, and the determining, by the robot, the task area to be executed according to the environmental information around the position when the robot is released from being hijacked, comprises:

determining, by the sweeping robot, a to-be-swept area according to the environmental information around the position when the sweeping robot is released from being hijacked;

wherein the determining, by the sweeping robot, the to-be-swept area according to the environmental information around the position when the sweeping robot is released from being hijacked, further comprises:

recognizing whether the environmental information around the position when the sweeping robot is released from being hijacked contains a corner;

and if the corner is contained, determining an associated area of the corner as the to-be-swept area;

and wherein the determining the associated area of the corner as the to-be-swept area comprises:

determining a sector area by taking a vertex of the corner as a circle center and a distance from the position when the sweeping robot is released from being hijacked to the vertex of the corner as a radius, and taking the sector area as the to-be-swept area; or determining a rectangular area by taking a distance from the position when the sweeping robot is released from being hijacked to any side of the corner as a half side length, and taking the rectangular area as the to-be-swept area.

* * * * *